United States Patent [19]

Brennan et al.

[11] 3,864,424

[45] Feb. 4, 1975

[54] ISOMERIZATION PROCESS

[75] Inventors: John F. Brennan; Herman S. Bloch, both of Des Plaines, Ill.

[73] Assignee: Universal Oil Products Company, Des Plaines, Ill.

[22] Filed: Apr. 30, 1973

[21] Appl. No.: 356,008

[52] U.S. Cl. .............................................. 260/683.2
[51] Int. Cl. .............................................. C07c 5/30
[58] Field of Search .................................. 260/683.2

[56] References Cited
UNITED STATES PATENTS

| | | | |
|---|---|---|---|
| 2,353,552 | 7/1944 | Drennan | 260/683.2 |
| 2,591,367 | 4/1952 | McAllister | 260/683.2 |
| 3,538,182 | 11/1970 | Kahn | 260/683.2 |
| 3,558,733 | 1/1971 | Myers | 260/683.2 |
| 3,631,219 | 12/1971 | Myers | 260/683.2 |
| 3,642,933 | 2/1972 | Heckelsberg | 260/683.2 |
| 3,726,935 | 4/1973 | Koch | 260/683.2 |

OTHER PUBLICATIONS

Kazanskii et al., Doklady Akad. Navk. SSSR, Vol. 130, No. 1, 1960, pp. 82–85.

*Primary Examiner*—Paul M. Coughlan, Jr.
*Attorney, Agent, or Firm*—James R. Hoatson, Jr.; Raymond H. Nelson; William H. Page, II

[57] ABSTRACT

The catalytic isomerization of a double bond located on a tertiary carbon atom is effected by utilizing a partially dehydrated weakly acidic alumina catalyst.

7 Claims, No Drawings

ISOMERIZATION PROCESS

This invention relates to a process for the catalytic isomerization of a double bond in an open chained ethylenic hydrocarbon. More specifically, this invention relates to the isomerization that creates the migration of a transitory double bond in a branch-chained olefin to form isomeric trisubstituted ethylenes utilizing a partially dehydrated weakly acidic alumina catalyst.

It has been shown that the utilization of alumina or alumina and a strong acid as a catalyst is capable of isomerizing a double bond involving a tertiary carbon atom to one involving secondary carbon atoms. Alumina and aluminum fluoride have been shown to promote skeletal isomerization at elevated temperatures in the presence of a Group IV oxide or sulfide or a Group VIII metal.

In contradistinction to the prior art it has now been discovered that the partially dehydrated weakly acidic alumina catalyst will effect an isomerization of a double bond in an olefin containing a tertiary carbon atom to form trisubstituted ethylenes without any appreciable further isomerization to 1,2-disubstituted olefins and without the formation of dimers with other double bonded molecules. The utilization of the present invention will enable the manufacturer of a desired double bonded compound to effect a more feasible and less costly means of production along with the added parameter of producing a more diversified inventory of chemical compounds. The process of the present invention may also be carried out at lower temperatures than exemplified in the prior art, thereby giving the manufacturer the additional advantage of lower costs of heat maintenance and lowering the capital investments in the procurement and upkeep of large expensive heating equipment.

The desired products of this invention, namely doubly bonded compounds with a specific situs of the double bond attached to the tertiary carbon atom, are utilized in the chemical industry in many ways. For example, very specific structures of pure reactants are needed in the natural synthesis of some organic compounds, or as pure compounds in the calibration or standardization of analytical instrumentation such as gas chromatography, mass spectrometer spectroscopy or nuclear magnetic resonsance spectroscopy instrumentation.

It is therefore an object of this invention to provide an isomerization process for the movement of a double bond to a different position in a molecule containing a tertiary carbon atom to form a trisubstituted ethylene without forming a double bond involving only secondary carbon atoms or a dimer of doubly bonded molecules.

A further object of this invention is to provide an isomerization process for the movement of a double bond to a different position in a branch-chained ethylene compound without forming 1,2-disubstituted ethylenes or dimers of a doubly bonded molecule, utilizing a partially dehydrated weakly acidic alumina catalyst.

In one aspect an embodiment of this invention resides in a process for the isomerization of the double bond of a branch-chained ethylene compound to a different situs involving the tertiary carbon atom which comprises treating said branch-chained ethylene compound with partially dehydrated weakly acidic alumina at reaction conditions and recovering the resultant isomerized tribsubstituted ethylene compound.

A specific embodiment of this invention resides in a process for preparing 2-methylbutene-2 which comprises the passage of 2-methylbutene-1 over partially dehydrated weakly acidic alumina at a temperature in the range of about 35°C to about 80°C and a pressure in the range of about atmospheric to about 100 atmospheres and recovering the resultant 2-methylbutene-2.

Another specific embodiment of this invention resides in a process for preparing 2-ethylpentene-1 which comprises the passage of 3-methylhexene-3 over dehydrated weakly acidic alumina at a temperature of 35°C and at atmospheric pressure and recovering the resultant mixture of 2-ethylpentene-1, 3-methylhexene-3 and 3-methylhexene-2.

Other objects and embodiments will be found in the following further detailed description of the present invention.

As hereinbefore set forth the present invention is concerned with a process for the isomerization of a double bond to a new location involving a tertiary carbon atom of a branch-chained ethylene compound in the presence of a catalyst comprising partially dehydrated weakly acidic alumina. The isomerization is effected under conditions which include a temperature in the range of about 20°C to about 80°C and preferably in the range of about 40°C to about 75°C. In addition, another reaction condition involves pressure, the pressures utilized ranging from about atmospheric up to 100 atmospheres or more. When superatmospheric pressures are employed, said pressure may be imposed by the introduction of a substantially inert gas such as nitrogen, helium or argon into the reaction zone, the particular pressure which is used being that which is necessary to maintain a major portion of the reactants in the liquid phase.

Examples of suitable branch-chained ethylene compounds which are utilized as the starting materials in the isomerization reaction would include 2-methylbutene-1, 2-methylbutene-2, 3-ethylpentene-2, 3-methylpentene-2, 3-methylhexene-2, 2-methylhexene-2, 3-methylhexene-3, 2-methylhexene-3, 2-methylheptene-1, 2-methylheptene-2, 3-methylheptene-3, 2-methyloctene-1, 3-methyloctene-2, 2-methyloctene-2, 3-methyloctene-3, 2-methylnonene-2, 2-methylnonene-1, 3-methylnonene-3, 3-methylnonene-4, 2-methyldecene-1, 2-methyldecene-2, 3-methyldecene-2, 3-methyldecene-3, etc. It is understood that the aforementioned branch-chained ethylene compounds are only representative of the class of compounds which may be employed as suitable starting materials, and that the present invention is not necessarily limited thereto.

The catalytic composition of matter which is used in the process of this invention comprises γ-alumina [Al$_2$O$_3$] which has been partially dehydrated resulting in the weakly acidic composition of matter. It is also contemplated within the scope of this invention that other inorganic oxides such as magnesia, silica, zirconium, thorium may be utilized, although not necessarily with equivalent results.

The process of this invention may be effected in any suitable manner and may comprise either a batch or continuous type operation. For example, when a batch type operation is employed, the branch-chained ethylene compound is placed in an appropriate vessel along with the partially dehydrated weakly acidic alumina catalyst. If atmospheric pressure is to be employed, the reaction vessel is then heated to a predetermined operating temperature, preferably between about 40° and 75°C. After maintaining the reactants in the reaction vessel at this temperature for a reaction time which may range from 0.2 hours up to about 60 hours or more in duration, heating is discontinued and the vessel allowed to return to room temperature. The reaction mixture is then recovered, separated from the catalyst and subjected to conventional means of purification and separation, means including washing, drying, extraction, evaporation, fractional distillation, etc., where the desired branch-chained ethylene compound with a different situs of its double bond is recovered. Alternatively, if superatmospheric pressures are to be employed in the isomerization, the branch-chained ethylene compound is charged to a pressure vessel such as a rotating autoclave which contains partially dehydrated weakly acidic alumina. The autoclave is sealed and a substantially inert gas such as nitrogen is pressed in until the desired operating pressure is reached. The autoclave is then heated to the desired operating temperature and maintained thereat for a predetermined residence time. At the end of this time, heating is discontinued, the autoclave is allowed to return to room temperature and the excess pressure is discharged. The autoclave is opened and the reaction mixture is then treated in a similar manner to that hereinbefore set forth whereby the desired product is separated and recovered.

It is also contemplated within the scope of this invention that the reaction process for obtaining a branch-chained ethylene compound with the double bond on a particular situs may be effected in a continuous manner of operation. When such a type of operation is employed, the branch-chained ethylene feedstock is continuously charged to the reaction vessel containing the partially dehydrated weakly acidic alumina catalyst, said vessel being maintained at the proper operating conditions of pressure and temperature. After completion of the desired residence time, the reactor effluent is continuously withdrawn and subjected to conventional means of separation whereby the desired branch-chained ethylene compound with a different situs of its double bond is recovered while any other branch-chained ethylenes are recycled to the reaction zone to form a portion of the feedstock. Inasmuch as the catalytic composition of matter is solid in nature, various types of continuous operation may be used. One such type of operation comprises the fixed bed method in which the catalyst is disposed as a fixed bed in the reaction zone in either an upward or downward flow. Another type of operation which may be employed comprises the moving bed type operation in which the catalyst and the reactant are passed through the isomerization zone either concurrently or countercurrently to each other.

Examples of branch-chained ethylene compounds which may be prepared by the isomerization include 2-methylbutene-1, 2-methylbutene-2, 3-ethylpentene-2, 3-methylpentene-2, 3-methylhexene-2, 2-methylhexene-2, 3-methylhexene-3, 2-methylhexene-3, 2-methylheptene-1, 2-methylheptene-2, 3-methylheptene-3, 2-methyloctene-1, 3-methyloctene-2, 2-methyloctene-2, 3-methyloctene-3, 2-methylnonene-2, 2-methylnonene-1, 3-methylnonene-3, 3-methylnonene-4, 2-methyldecene-2, 2-methyldecene-1, 3-methyldecene-2, 3-methyldecene-3, etc. It is understood that the aforementioned branch-chained ethylene compounds are only representative of the class of compounds which may be prepared by the process of the present invention and that the present invention is not necessarily limited thereto.

The following examples are given to illustrate the process of the present invention, which, however, are not intended to limit the generally broad scope of the present invention in strict accordance therewith.

EXAMPLE I

In this example γ-alumina containing less than 0.1% chloride was treated with a stream of air at 550°C for 2 hours and with nitrogen for 1 hour before cooling prior to utilization. At this point 1 torr of 2-methylbutene-1 and 0.3 gram of said partially dehydrated weakly acidic alumina were placed in a flask provided with heating and pressure devices. The flask was heated to a temperature of 65°C and maintained at atmospheric pressure for a period of time comprising 16 hours. At the end of the aforementioned 16 hours, the heating was terminated and the flask allowed to return to room temperature, at which time the contents of the flask were separated from the catalyst and analyzed by means of gas chromatography instrumentation, said analysis disclosed the resultant gas to be 90 wt. % 2-methylbutene-2 and 10 wt. % 2-methylbutene-1.

EXAMPLE II

In this example 25 milliliters of 3-methylhexene-2 and 0.4 grams of partially dehydrated weakly acidic alumina are placed in an autoclave provided with heat and pressure devices. The alumina is partially dehydrated weakly acidic as a consequence of the same pretreatment as in Example I above. The autoclave is heated to a temperature of 60°C and maintained at a pressure of 10 atmospheres for a period of time comprising 25 hours. At the end of this period of time the heat is terminated and the pressure vented, thereby allowing the autoclave to return to room temperature and ambient pressure. The product is recovered from the autoclave, separated from the catalyst by filtration and analyzed by means of gas chromatography instrumentation, said analysis discloses the product to be a mixture of 3-methylhexene-3 and 2-ethylpentene-1 as well as unconverted 3-methylhexene-2.

EXAMPLE III

In this example 30 milliliters of 3-methylhexene-3 and 0.3 grams of partially dehydrated weakly acidic alumina, as prepared in Example I above, are placed in an autoclave equipped with heat and pressure devices. The autoclave is heated to a temperature of 50°C and maintained at a pressure of 50 atmospheres for a period of time comprising 10 hours. At the end of this period of time the heat is terminated and the pressure vented thereby allowing the autoclave to return to room temperature and ambient pressure. The product is recovered from the autoclave, separated from the catalyst by filtration and analyzed by means of gas chromatography instrumentation, said analysis discloses the product to be a mixture of 2-ethylpentene-1 and 3-methylhexene-2 with unconverted 3-methylhexene-3 also present.

EXAMPLE IV

In this experiment 50 milliliters of 2-methylnonene-1 and 0.5 grams of partially dehydrated weakly acidic alumina, as prepared in Example I above, are placed in an autoclave equipped with heat and pressure devices. The autoclave is heated to a temperature of 70°C and maintained for a period time comprising 40 hours at a pressure of 75 atmospheres. At the end of this period of time, the heat is terminated and the pressure vented thereby allowing the autoclave to return to room temperature and ambient pressure. The product is recovered from the autoclave, separated from the catalyst by filtration and analyzed by means of gas chromatography instrumentation, said analysis discloses the product to be mainly 2-methylnonene-2.

EXAMPLE V

In this example 25 milliliters of 2-amyloctene-1 and 0.7 grams of partially dehydrated weakly acidic alumina, as prepared in Example I above, are placed in an autoclave equipped with heat and pressure devices. The autoclave is heated to a temperature of 65°C and maintained for a period of time comprising 50 hours at a pressure of 100 atmospheres. At the end of this period of time the heat is terminated and the pressure vented thereby allowing the autoclave to return to room temperature and ambient pressure. The product is recovered from the autoclave, separated from the catalyst by filtration, and analyzed by means of gas chromatography instrumentation, said analysis discloses the product to be a mixture principally of 6-methyldodecene-6 and 6-methyldodecene-5.

We claim as our invention:

1. A process for the isomerization of a double bond located on the tertiary carbon atom of a branch-chained mono-olefin in which process the double bond is isomerized to a different situs involving the tertiary carbon atom without appreciable formation of disubstituted ethylenes or dimers, said process comprising treating said branch-chained mono-olefin at a temperature of from about 20° to about 80°C. with a catalyst consisting essentially of partially dehydrated weakly acidic gamma alumina containing less than 0.1% chloride, said alumina having been treated in an air stream at a temperature of about 550°C., and recovering the resultant isomerized product.

2. The process of claim 1 further characterized in that the reaction conditions include a pressure in the range of from about 1 atmosphere to about 100 atmospheres.

3. The process of claim 1 further characterized in that the compound in which the double bond is to be isomerized is 2-methylbutene-1 and the recovered isomerized product is 2-methylbutene-2.

4. The process of claim 1 further characterized in that the compound in which the double bond is to be isomerized is 3-methylhexene-2 and the recovered isomerized product is a mixture of 3-methylhexene-3 and 2-ethylpentene-1.

5. The process of claim 1 further characterized in that the compound in which the double bond is to be isomerized is 3-methylhexene-3 and the recovered isomerized product is a mixture of 2-ethylpentene-1 and 3-methylhexene-2.

6. The process of claim 1 further characterized in that the compound in which the double bond is to be isomerized is 2-methylnonene-1 and the recovered isomerized product is 2-methylnonene-2.

7. The process of claim 1 further characterized in that the compound in which the double bond is to be isomerized is 2-amyloctene-1 and the recovered isomerized product is a mixture of 6-methyldodecene-6 and 6-methyldodecene-5.

* * * * *